United States Patent [19]

Sassanelli et al.

[11] Patent Number: 4,992,088
[45] Date of Patent: Feb. 12, 1991

[54] PROCESS AND APPARATUS FOR THE BENDING OF FLAT SHEETS OF GLASS

[75] Inventors: Vito Sassanelli; Francesco Pracilio, both of Vasto, Italy

[73] Assignee: Societa Italiana Vetro - SIV - S.p.A., San Salvo, Italy

[21] Appl. No.: 420,004

[22] Filed: Oct. 11, 1989

[30] Foreign Application Priority Data

Oct. 11, 1988 [IT] Italy .................. 48442 A/88

[51] Int. Cl.$^5$ .................................. C03B 23/023
[52] U.S. Cl. ........................... 65/106; 65/287; 65/289
[58] Field of Search ............... 65/106, 273, 287, 289

[56] References Cited

U.S. PATENT DOCUMENTS

| | | | |
|---|---|---|---|
| 3,338,695 | 8/1967 | Ritter, Jr. | 65/104 |
| 3,485,618 | 12/1969 | Ritter | 65/106 |
| 3,684,473 | 8/1972 | Ritter, Jr. | |
| 3,734,706 | 5/1973 | Ritter, Jr. | |
| 3,905,794 | 9/1975 | Revells et al. | 65/106 |

FOREIGN PATENT DOCUMENTS 1474251 3/1966 France .

Primary Examiner—Joye L. Woodard
Attorney, Agent, or Firm—Wenderoth, Lind & Ponack

[57] ABSTRACT

In a horizontal plant for the production of curved and tempered sheets of glass, an apparatus for the bending of the sheets of glass is provided. Conveyor rollers are provided that are downwardly mobile at opposite ends thereof, one with respect to the other. The conveyor rollers are situated between male and female bending moulds, thus permitting the production of sheets of glass having complex forms, reduced thicknesses and notable dimensions. The bending process makes use of the possibility of inclining the rollers to place the sheet of heated glass on the female mould.

6 Claims, 5 Drawing Sheets

PROCESS AND APPARATUS FOR THE BENDING OF FLAT SHEETS OF GLASS

BACKGROUND OF THE INVENTION

1. Field of the Invention

The present invention relates to an improved process and apparatus for the bending of sheets of glass.

Such products are commonly used as windows for motor vehicles in general, and in particular for automobiles. This kind of use requires that the sheets of glass be manufactured respecting precisely both the prescribed dimensions and tolerances and the configuration required by the body of the automobile. It is furthermore necessary that the visibility through the sheets of glass is not obstructed by optical distortions or defects in the windows.

Tempering treatment using heat increases the resistance of the sheets of glass to impact, and guarantees that the fragments of glass produced in the case of breakage will be less dangerous than fragments which would be produced in non-tempered glass.

2. Description of the Prior Art

As is known, sheets of tempered glass, in particular those used by the automobile industry, can be produced in plants with a horizontal line of travel, permitting a high production throughput.

In these plants, each sheet is transported horizontally through a tunnel oven in which it is heated up to a deformation temperature, is then transferred to a bending station where the sheet is shaped, and then reaches a tempering station and successively a cooling station.

With reference to the bending station, a bending method is known which uses the force of gravity and the pressure of a mould in order to obtain the shaping of the sheet of glass in the most exact manner possible.

In particular, the pressure-bending of the heated sheets takes place between male and female moulding plates having complementary shaping surfaces.

The sheets of glass are horizontally supported by a female plate, hereinafter referred to as the "ring", the bearing surface of which is divided into segments to allow the passage of the ring itself upwards by means of a plurality of conveyor rollers.

Descriptions of this prior art can be found in U.S. Pat. No. 3,338,695 (Ritter), in French patent No. 1,474,251 (LOF), in U.S. Pat. No. 3,684,473 (Ritter) and in Luxembourg patent No. 65146 (Ritter). The method used to bend the sheets of glass according to the above mentioned patents consists essentially in the fact that the sheet itself, after having been heated in an oven up to the softening temperature, arrives, by means of horizontal conveyor rollers, in registry with the shaping ring, which, passing beyond the conveyor rollers, lifts up the sheet and carries it towards the mould, wherein the final shaping takes place. Subsequently the ring is lowered, passing back through the conveyor rollers and leaving the curved sheet of glass on the same horizontal rollers. The convey rollers then carry the sheet of glass towards the tempering station.

During the past years great commercial importance has been given to the production of curved and tempered sheets of glass with more and more reduced thicknesses (going from values of between 5 and 6 mm in thickness to values of between 2.5 and 4 mm in thickness), with ever greater dimensions, due to the increases in the window surfaces in automobiles, and having complex curvatures, in particular spherical curvatures.

In practice, the sheets of glass have become thinner, larger and preferably spherical. The above-described shaping technology is no longer suitable for the production of sheets of glass according to the market requirements.

In addition to the above, a further difficulty in production is the market trend toward requiring sheets of glass which are curved to conform to the bodywork, these sheets thus presenting wings which are sharply curved towards the interior of the vehicle.

The prior art method is not suitable for providing this kind of production at a commercially acceptable cost, as the prior art method is not capable of an efficient control of the curvature of the glass. The glass is of a thickness ranging from 2.5 to 4 mm and tends to increase more than is necessary its concavity towards its bottom, due to the effect of the force of gravity. Furthermore, the prior art is not capable of checking the precise shape of the sheet itself, especially when the sheet has sharp upwardly-turned wings, because when the sheet is laid down on the conveyor rollers it tends to lose the shape which has been given to it, as the sheet is still in a plastic state. The object of the present invention is to overcome the above mentioned problems, providing an improved process and apparatus for the bending of sheets of glass which permits the bending of sheets of glass into complex forms having reduced thicknesses and large dimensions.

SUMMARY OF THE INVENTION

The above objects are achieved by rendering slidable, along their vertical plane, the horizontal conveyor rollers situated in the area between the ring and the male bending mould.

In particular, an inclination of each roller occurs in a direction opposite to that of an adjacent roller, so that the final result is a series of rollers crossing each other downwards, forming a very wide obtuse angle, with its apex towards the center of the rollers themselves, and crossing the bearing plane of the bending ring.

By means of this movement, which is electrically controlled and adjusts to the width of the angle according to the specific need, it is possible to place the heated sheet of glass on the ring, thus avoiding an excess downward concavity of its surface.

Following the pressure bending, it is possible for the cradle formed by the crossed rollers to receive the sheet of glass, thus preventing it from losing its predetermined shape.

The object of the invention is therefore an improved apparatus for the bending of a sheet of glass, suitable for use as a window for a vehicle in general and for an automobile inparticular, consisting essentially of conveyor means for the transport of the sheet of glass, heated up to its deformation temperature, along a horizontal transport plane. Male and female bending moulds for pressure shaping are placed, respectively, at a higher and a lower level with respect to the transport plane. Supports for the conveyor means are also provided. The conveyor means comprises conveyor rollers at least in the area between the male and female bending moulds. The rollers are connected to the supports by means of swivel joints in such a way that the rollers can be inclined with respect to the transport plane.

A further object of the present invention is to provide an improved process for the bending of a sheet of glass, suitable for use as a window for a vehicle in general and for an automobile in particular. The process essentially consists of heating a sheet up to its deformation temperature in an oven provided with a horizontal conveyor for transportation of the sheet of glass, and pressure bending the sheet between the complementary surfaces of contraposed male and female moulds. The sheet of glass is placed on the female bending mould by means of the horizontal conveyor rollers, located in the area between the bending moulds. The rollers are lowered in a crossed configuration to place the glass on the female bending ring, the glass is pressure shaped between the male and female moulds, the female mould is lowered and the glass is released onto the crossed rollers.

BRIEF DESCRIPTION OF THE DRAWINGS

The invention is described in greater detail herebelow with reference to the drawings, which represent an embodiment thereof.

DESCRIPTION OF THE PREFERRED EMBODIMENTS

Figure 1:
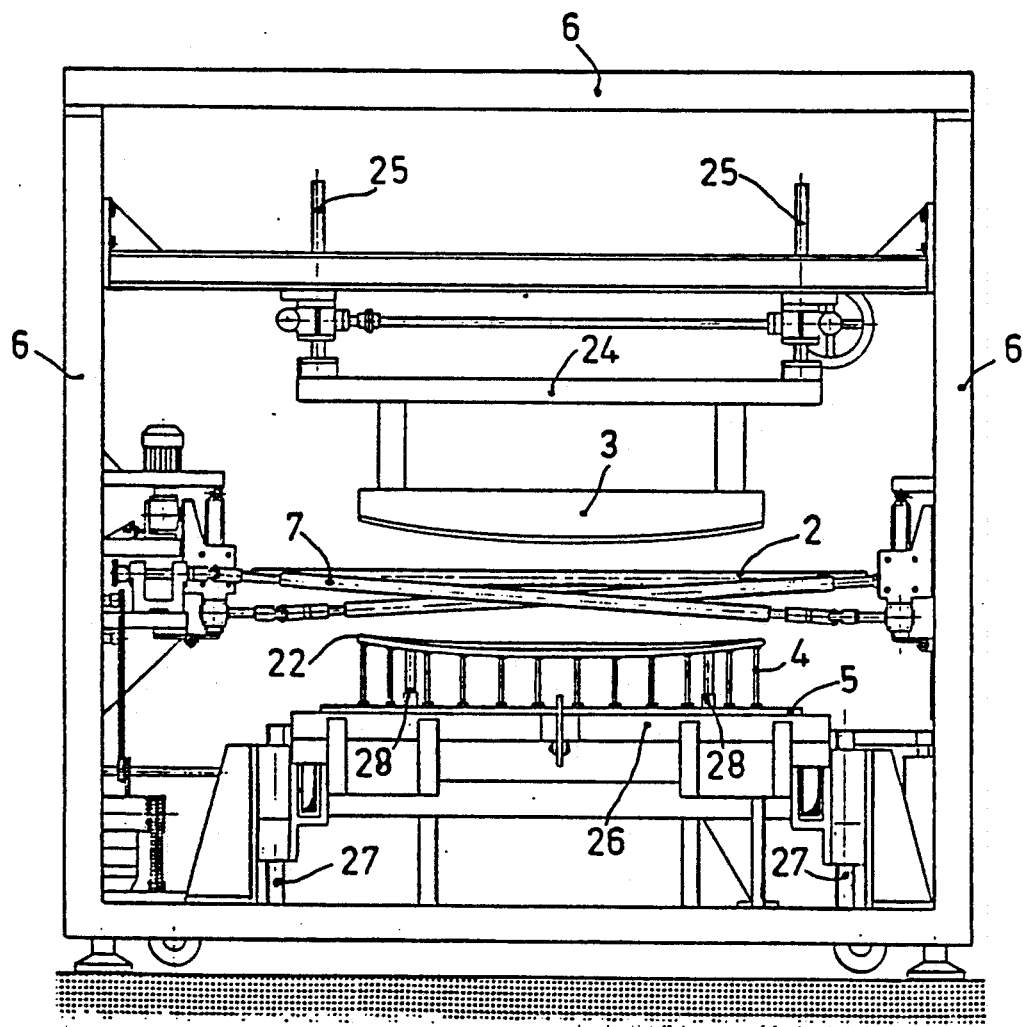
FIG. 1 is a front view of the apparatus according to the invention.
Figure 2:
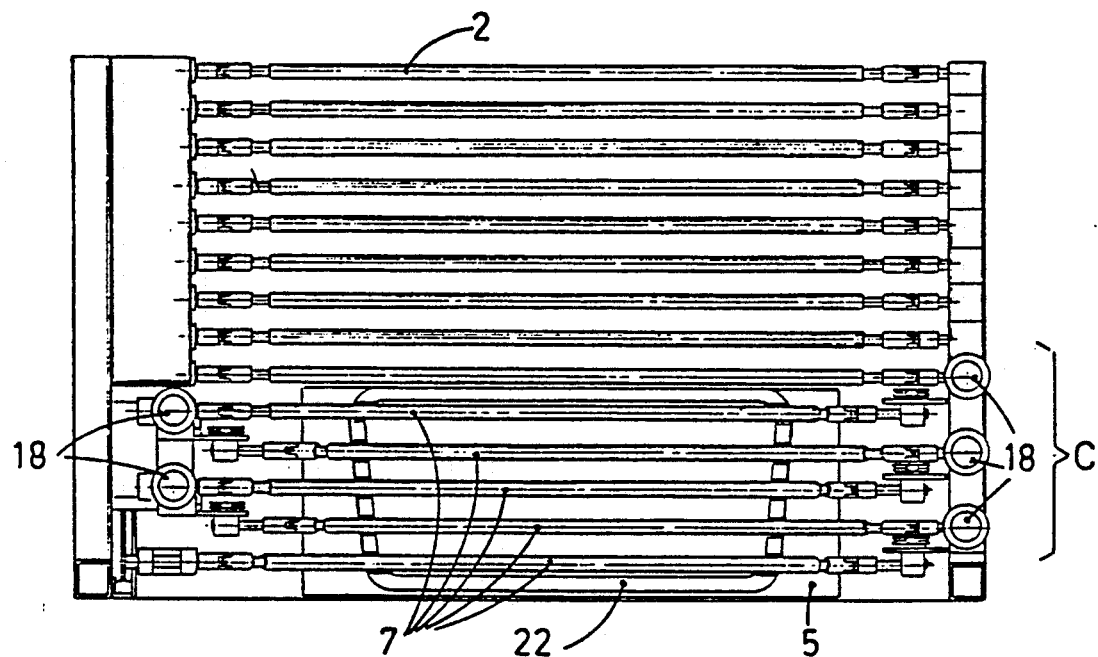
FIG. 2 is a top view of the bending station according to the present invention.
Figure 5:
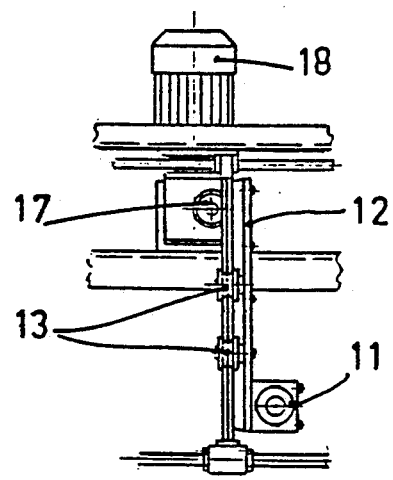
FIG. 5 is a view of the elements of the moving system for the mobile rollers.
Figure 3:
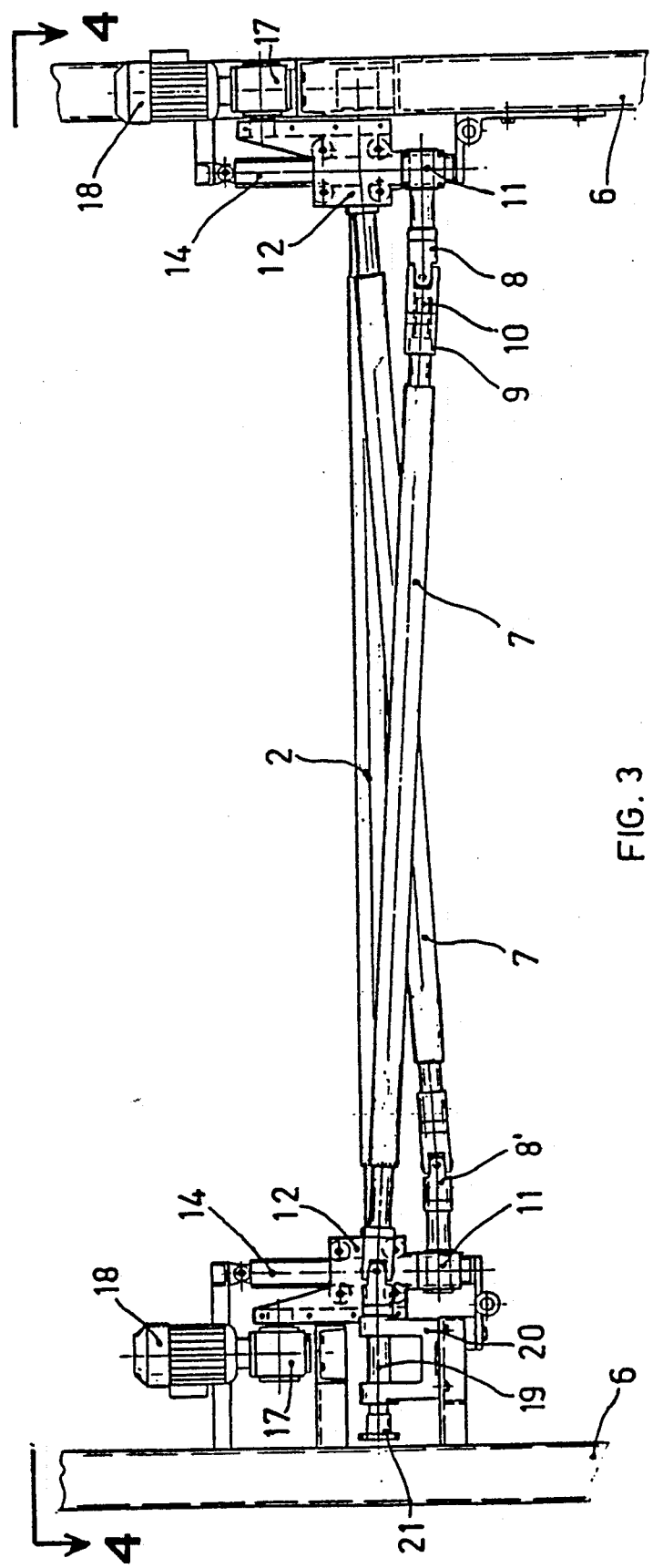
FIG. 3 is a front view of the bending rollers and the moving means for the same.
Figure 4:
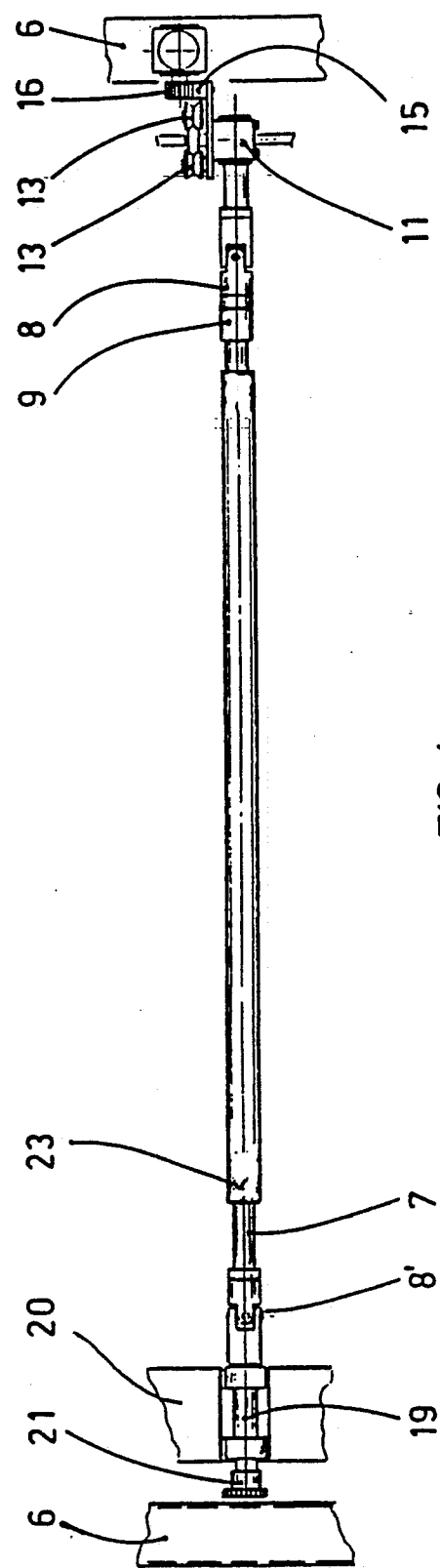
FIG. 4 is a top view, along the line 4—4, of one of the mobile rollers of FIG. 3.
Figure 6:
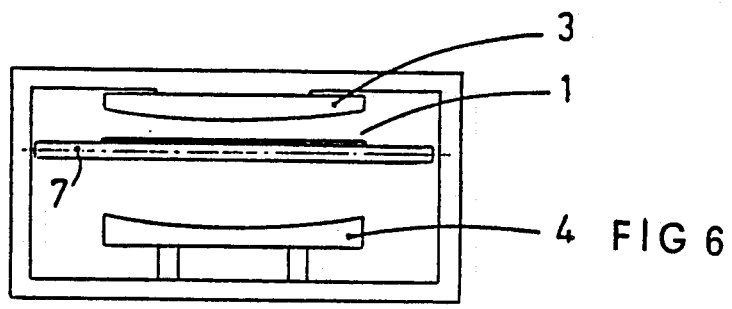
FIGS. 6 to 9 show the main steps of the bending of a sheet of glass according to the process of the present invention.

With reference to FIGS. 1 to 6, and in accordance with the present invention, a sheet of glass 1 is heated up to a deformation temperature in a horizontal oven, and then transported by means of horizontal rollers 2 to a bending station C. In the bending station C two bending moulds having complementary surfaces are present, one in an upper position with respect to the plane of the conveyor rollers, hereinafter called "male" and indicated as 3, and the other in a lower position with respect to the conveyor rollers, hereinafter called a "ring" and indicated as 4. The ring 4 is supported by a planar member 5 capable of being lifted in such a way as to allow a frame 22 of the ring 4 to pass beyond the level of the horizontal rollers 2 until coming into contact with the male mould 3. The planar member 5 rests on a table 26 controlled by a hydrodynamic lifting system, not shown in the drawings, which causes it to slide along the guides 27 in a vertical direction.

A metal frame 6, constituted of suitable tubular beams, carries the shaping moulds 3 and 4. In particular, the male mould 3 is carried by a horizontal bar 24 supported by two racks 25, which can slide in a vertical direction in such a way as to adjust the height of the male mould 3 with respect to the plane of the rollers 2.

In registry with the bending ring 4, and on the same horizontal plane as the conveyor rollers 2, are placed rollers 7. The rollers 7 are movable in such a way that they can be inclined from the horizontal, each roller being inclined in an opposite direction with respect to an adjacent roller, and such that they can descend through the segments of the bearing frame 22. Both the conveyor rollers 2 and the mobile rollers 7 are covered, along the entire length thereof which can come into contact with a sheet of glass, with a knitted sleeve 23 of insulating glass-fibers. At the two extremities of each roller 7 are two swivel joints 8 and 8', giving the roller the ability to move in a vertical plane. To this end, a sleeve 9 spans over a lubricated slot 10 in which one of the two extremities of the roller can slide and thus recover the play necessary for inclined movement. A support 11, on the extremity where the sleeve 9 and slot 10 are present, connects the roller 7 to a plate 12. Plate 12 is provided with small wheels 13, which run on a rail 14. A rack 15 is also connected to the plate 12, and meshes with a pinion 16. Pinion 16 is rotated by a reducer gearbox 17 connected to a motor 18. On the extremity opposite from that of the sliding plate 12, the roller 7 is connected to a shaft 19 rotatably supported by a fixed support 20. A pinion 21 on the shaft 19 is driven by a chain transmission, not shown in the drawings, and transmits a rotatory motion to the roller 7.

A suitable number of mobile rollers 7 are placed in registry with the ring 4, inclinable in opposed directions, one with respect to the other, in such a way as to create a cradle in which a sheet of glass rests. In particular, the rollers 7 perform a transport function when they are in a horizontal position, and a bending function when they are inclined. In fact, when the sheet of glass 1 arrives in registry with the ring 4, the rollers 7 stop, due to a system for detecting the position of the glass not shown in the drawings. The sheet of glass then rests against the mechanical stops 28.

According to the present invention, the rollers 7 incline in their vertical plane, but in opposite directions, one with respect to the other, in such a way as to pass down below the bearing frame 22 of the ring 4 and thus lay the sheet of glass on the ring 4. In particular, the motor 18 and the reducer gearbox 17, by means of the pinion 16 and the rack 15, cause the support 11 to move downwards and thus determine the inclination of the roller 7. A similar movement takes place at an adjacent roller at the other extremity, thus causing the roller to incline downwards, but in the opposite direction.

Figure 7:
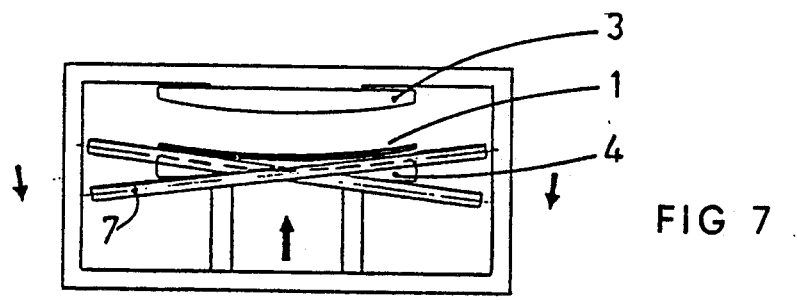
Figure 8:
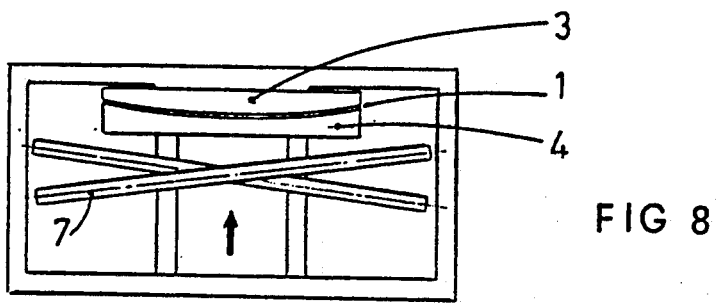
Figure 9:
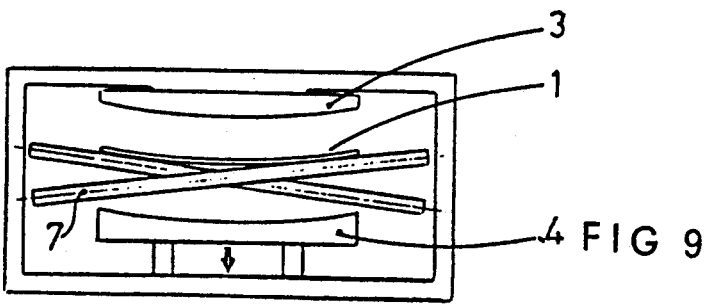

In FIGS. 6 to 9 the various bending phases of the piece, carried out according to the present invention, are shown schematically.

The sheet of glass 1 reaches the rollers 7 and stops (I). The ring 4 then rises until its bearing surface is immediately underneath the sheet of glass. The rollers 7 cross until bringing the sheet of glass 1 onto the ring 4 (II). The ring 4 then carries the sheet of glass towards the male mould (III). The ring 4 subsequently descends below the crossed rollers 7, leaving the sheet of glass 1 on the rollers 7, which then start up again, removing the sheet from the bending area (IV).

This cycle commences once more with the rollers 7 returning to their horizontal position to collect a following sheet of glass which has to be bent.

Although a preferred embodiment has been described in detail, it is understood that certain changes may be made in the above construction, without departing from the spirit and scope of the invention.

We claim:

1. A method of bending a sheet of glass, comprising the steps of:

heating a sheet of glass to be bent in an oven to its deformation temperature;

transporting said sheet of glass on a means for horizontally conveying a sheet of glass from said oven to a position between contraposed male and female moulds, said means for horizontally conveying having a plurality of horizontal conveyor rollers located between said male and female moulds;

inclining individual ones of said horizontal conveyor rollers in opposite directions by lowering one end of each of said horizontal conveyor rollers so as to form a cross-sectionally crossed configuration of said horizontal conveyor rollers and lower said sheet of glass onto said female mould;

bending and shaping said sheet of glass between said male and female moulds; and lowering said female mould so as to release said sheet of glass onto said crossed configuration of said horizontal conveyor rollers.

2. An apparatus for bending a sheet of glass, comprising:

a conveyor means for conveying a sheet of glass to be bent along a substantially horizontal transport plane;

a male bending mould supported at a position above said substantially horizontal transport plane;

a female bending mould supported at a position below said substantially horizontal transport plane;

means for vertically moving said male and female bending moulds relative to each other so as to be able to bend a sheet of glass therebetween; and a support for supporting said conveyor means;

wherein said conveyor means comprises a plurality of inclinable conveyor rollers between said male and female bending moulds and means for connecting said plurality of inclinable conveyor rollers to said support such that said inclinable conveyor rollers can be inclined relative to said substantially horizontal transport plane, said means for connecting comprising a vertically fixed connection for one end of each said inclinable conveyor roller and a vertically movable connection for the other end of each said inclinable conveyor roller.

3. The apparatus as set forth in claim 2, wherein:

each said inclinable roller has its respective said fixed connection at an end thereof opposite to the end whereat adjacent said inclinable rollers have their respective said fixed connections.

4. The apparatus as set forth in claim 2, wherein said vertically movable connection of said means for connecting comprises, for each said inclinable roller, a rack, a swivel joint connecting said rack to said other end of said inclinable roller, and a pinion, a motor and a reducer gearbox on said support for driving said rack vertically, whereby the inclination of each said inclinable roller can be adjusted by operation of its respective said motor such that said roller can assume an inclination suitable for bending a sheet of glass.

5. The apparatus as set forth in claim 4, wherein:

a sliding plate is connected to said swivel joint, and said rack is fixed to said sliding plate;

a rail is fixed to said support; and a plurality of rollers are rotatably connected to said sliding plate for rolling engagement with said rail.

6. The apparatus as set forth in claim 2, wherein:

said vertically fixed connection of each said inclinable conveyor roller has a swivel joint connected to said one end one end of said inclinable conveyor roller, a shaft connected to said swivel joint, and a fixed support member fixed to said support for vertically fixing but rotatably supporting said shaft.

* * * * *